United States Patent [19]

Knight et al.

[11] 4,213,880

[45] Jul. 22, 1980

[54] HYDROCARBON SOLUTIONS OF ORGANOMAGNESIUM COMPOUNDS

[75] Inventors: George W. Knight, Lake Jackson; Dennis E. Mach, Alvin, both of Tex.

[73] Assignee: The Dow Chemical Company, Midland, Mich.

[21] Appl. No.: 612,397

[22] Filed: Sep. 11, 1975

[51] Int. Cl.² .............................................. B01J 31/12
[52] U.S. Cl. ............................ 252/431 R; 252/431 N
[58] Field of Search ........................ 252/431 R, 431 N

[56] References Cited

U.S. PATENT DOCUMENTS

| | | | |
|---|---|---|---|
| 3,444,102 | 5/1969 | Ito et al. ........................ | 252/431 N X |
| 3,597,487 | 8/1971 | Shepherd ....................... | 252/431 R X |
| 3,646,231 | 2/1972 | Kamienski et al. ........... | 252/431 R X |
| 3,694,422 | 9/1972 | Long .............................. | 252/431 R X |
| 3,699,079 | 10/1972 | Haynes .......................... | 252/431 N X |
| 3,737,393 | 6/1973 | de Vries ........................ | 252/431 R |
| 3,766,091 | 10/1973 | Vandenberg ................... | 252/431 R |
| 3,770,655 | 11/1973 | Vandenberg ................... | 252/431 N |
| 3,856,835 | 12/1974 | Guillot .......................... | 252/431 N X |
| 3,878,124 | 4/1975 | Durand et al. ................. | 252/431 R X |
| 3,903,019 | 9/1975 | Hargis et al. .................. | 252/431 R |

*Primary Examiner*—Delbert E. Gantz
*Assistant Examiner*—William G. Wright
*Attorney, Agent, or Firm*—Michael S. Jenkins; Michael L. Glenn

[57] ABSTRACT

A low viscosity hydrocarbon solution of a dihydrocarbyl magnesium compound such as di(n-butyl) magnesium is provided by combining the dihydrocarbyl magnesium with a solubilizing amount of an organozinc or organoboron compound, a hydrocarbon liquid and a viscosity reducing agent such as an ether, alcohol, or an organo aluminum compound. Such solution is very useful in the preparation of high efficiency catalysts for the polymerization of ethylene and other alpha alkylenes at polymerization temperatures above 150° C.

13 Claims, No Drawings

HYDROCARBON SOLUTIONS OF ORGANOMAGNESIUM COMPOUNDS

BACKGROUND OF THE INVENTION

This invention relates to hydrocarbon solutions of organomagnesium compounds and more particularly to hydrocarbon solutions of diorganomagnesium reagents.

Organomagnesium halides, commonly known as Grignard reagents, have wide utility in chemical reactions. By comparison with these organomagnesium halides, diorganomagnesium compounds are employed far less frequently, although such compounds undergo reactions analagous to those of organomagnesium halides. A primary reason for the preference of the Grignard reagents resides in the fact that large amounts of diorganomagnesium compounds are not easily prepared. In general, if such compounds could be readily prepared by methods which do not adversely affect the properties of the organomagnesium compounds, the diorganomagnesium compounds would be preferable both from a cost standpoint and a performance standpoint as compared to Grignard reagents. For example, the diorganomagnesium compounds can be more readily solubilized in hydrocarbon than the Grignard reagent. Moreover, better yields are obtained in numerous reactions employing diorganomagnesium compounds instead of Grignard reagents. In particular the diorganomagnesium compounds are known to be useful in the preparation of various polymerization catalysts. See, for example, teachings of their use in the preparation of Ziegler catalysts in the following: U.S. Pat. No. 3,051,690, U.S. Pat. No. 3,070,549 and U.S. Pat. No. 3,392,159. More recently, it has become advantageous to employ such compounds as the sole or as one of two or more of reducing organo metallic compounds in Ziegler catalysts. As recently observed, the use of such organomagnesium compounds in the manufacture of Ziegler catalysts often results in a catalyst having very high efficiency.

In practices employed heretofore, it has often been necessary to solubilize the organomagnesium compounds by dispersing them in ether, or like polar liquid, prior to use in the preparation of the desired catalyst. Accordingly, it would be highly desirable to devise a procedure for solubilizing organomagnesium compounds without the aid of significant quantities of polar liquids such as ethers, alcohols and the like. In an attempt to obtain this objective, it has sometimes been the practice to disperse the organomagnesium compound in a hydrocarbon liquid by stirring or other mechanical means. Unfortunately such dispersions or suspensions are not very stable. Therefore there is a non-uniform distribution of the organomagnesium compound in the hydrocarbon solvent which is further aggravated by the fact that the insoluble organomagnesium compounds settle from the suspensions or dispersions upon passage of time.

In order to stabilize such dispersions or suspensions, it has been taught in Annalen No. 605,93-97 (1957), and more recently in U.S. Pat. No. 3,737,393, to add an alkyl aluminum compound to the dispersion of dialkyl magnesium compound in hydrocarbon liquid. Unfortunately, catalysts prepared from such organomagnesium complexes exhibit significantly lower catalyst efficiencies at polymerization temperatures above 150° C.

Therefore, it would be highly desirable to solubilize a diorganomagnesium compound in a hydrocarbon solvent in a manner such that catalyst prepared from such hydrocarbon soluble diorganomagnesium compounds exhibit high catalyst efficiencies even at polymerization temperatures above 150° C.

SUMMARY OF THE INVENTION

The present invention is a hydrocarbon solution of a diorganomagnesium component comprising a diorganomagnesium compound, a liquid hydrocarbon solvent, a solubilizing amount of an organozinc or an organoboron compound, or a mixture thereof and a viscosity reducing agent in an amount sufficient to facilitate separation of suspended solids from the solution. These hydrocarbon solutions of diorganomagnesium compounds are useful as the organometallic component in the preparation of high efficiency Ziegler catalysts for the polymerization of α-alkylenes, particularly ethylene. In addition, such hydrocarbon solutions of diorganomagnesium compounds are particularly valuable insofar as they afford relatively high concentrations of organomagnesium for one step chemical reactions not attained with diorganomagnesium compounds in other solvents. They constitute a new catalyst system for multistep reactions such as oligomerization and polymerization. Finally, they may be used as a basic material from which other catalyst systems can be conveniently prepared such as the Ziegler catalyst mentioned hereinbefore.

DETAILED DESCRIPTION OF THE EMBODIMENT

In the practice of this invention, a diorganomagnesium compound is solubilized in a hydrocarbon liquid by adding an effective amount of an organoboron or organozinc compound.

For the purposes of this invention the diorganomagnesium compound is defined as a divalent magnesium compound having two organic radicals such as hydrocarbyl or hydrocarbyloxy. The term "hydrocarbyl" includes hydrocarbon groups such as alkyl, cycloalkyl, aralkyl, alkaryl, alkenyl, etc., and the term "hydrocarbyloxy" includes oxyhydrocarbon groups such as alkoxy, aryloxy, etc. Preferably the diorganomagnesium compound is a dihydrocarbyl magnesium such as the magnesium dialkyls and magnesium diaryls. Exemplary suitable magnesium dialkyls include dibutyl magnesium, dipropyl magnesium, diethyl magnesium, dihexyl magnesium, propylbutyl magnesium and others wherein alkyl has from 1 to 20 carbon atoms. Exemplary suitable magnesium diaryls include diphenyl magnesium, dibenzyl magnesium, ditolyl magnesium and the like. The dialkyl magnesiums such as dibutyl magnesium are especially preferred. Other suitable magnesium compounds include alkyl and aryl magnesium alkoxides and aryloxides.

The diorganomagnesium compounds, e.g., the preferred dialkyl magnesium compounds, are readily prepared by reacting particulate magnesium such as magnesium turnings or magnesium particles with approximately a stoichiometric amount of the hydrocarbyl halide such as an alkyl halide. The resulting hydrocarbon-insoluble dihydrocarbyl magnesium is recovered and is ready for solubilization in accordance with the present invention. Other exemplary methods for making the diorganomagnesium compound appear in U.S. Pat. Nos. 3,737,393 and 3,392,159.

In the instant invention, the organoboron and organozinc compounds suitably employed as solubilizing agents are illustratively represented by the formula $MR_x$ wherein M represents zinc in the divalent state or trivalent boron, and R is an organo group such as hydrocarbyl, or oxyhydrocarbyl as defined hereinbefore and x represents an integer corresponding to the valence of M.

Exemplary solubilizing agents include triethyl boron, trimethyl boron, tributyl borate, dimethyl zinc, diethyl zinc, diisopropyl zinc, and other zinc alkyls, boron alkyls, zinc alkoxides, boron alkoxides, and mixtures thereof. Also suitable are other organoboron and organozinc compounds such as hydrocarbyls and hydrocarbyl oxides of boron and zinc such as diphenyl zinc, triphenyl borate and the like. Of the foregoing, diethyl zinc and similar zinc dialkyls are preferred.

The amount of solubilizing agent which is added to the diorganomagnesium compound should be enough to solubilize a significant amount of the diorganomagnesium compound, e.g., at least enough to form a hydrocarbon solution containing 0.4 weight percent or more of magnesium. Preferably, solutions containing at least 0.7 weight percent of magnesium are produced, with solutions containing at least 1.5 weight percent magnesium being especially preferred. While the amount of solubilizing agent required to provide the foregoing solutions of a diorganomagnesium compound will vary with each diorganomagnesium compound, it is generally found that from about 0.01 to about 1 mole of solubilizing agent is employed per mole of diorganomagnesium compound, preferably from about 0.1 to about 0.5 mole. In the preparation of the hydrocarbon solution of the diorganomagnesium compound, it is understood that the solubilizing agent may be added to the diorganomagnesium compound during and/or after the reaction to form the diorganomagnesium compound, particularly when such compound is prepared by the reaction of magnesium metal with a hydrocarbyl halide. In some cases it will be preferred to use the solubilizing agent both during and after the preparation of the diorganomagnesium compound in order to insure maximum concentration of the diorganomagnesium compound in the solution. In some instances it is desirable to add the solubilizing agent prior to the reaction of metallic magnesium and hydrocarbyl halide. While it is generally preferable to add the solubilizing agent in a preformed state dissolved in a hydrocarbon liquid, it may also be prepared in situ, for instance by the reaction of a zinc halide or boron halide with the diorganomagnesium compound being prepared.

Suitable viscosity reducing agents include ethers, alcohols, tertiary amines, aldehydes, ketones, organoaluminum compounds and similar compounds that suitably reduce the vicosity of the aforementioned solutions without destroying the solution or any component thereof. Exemplary viscosity reducing agents include the aliphatic and cycloaliphatic ethers of 2 to 20 carbon atoms such as the straight chain ethers, e.g., di-n-alkyl ethers of 2 to 10 carbon atoms including diethyl ether and dibutyl ether, and cycloalkyl ethers of 5 to 6 carbon atoms, e.g., tetrahydrofuran and tetrahydropyran. Also included are the aliphatic and aromatic alcohols such as ethanol, isopropanol and butanol as well as phenyl, benzylalcohol and the others having 20 or fewer carbon atoms. Other suitable agents include organic compounds, preferably having no more than 20 carbon atoms, such as tertiary alkyl amines of 3 to 20 carbon atoms which will complex with, but are otherwise inert to, the organomagnesium compound; aldehydes such as acetaldehyde and benzaldehyde; ketones such as methyl ethyl ketone and diethyl ketone as well as acetophenone. Also useful as viscosity reducing agents are (1) organoaluminum compounds exemplified by the formula $AlR_aX_{3-a}$ wherein R is hydrocarbyl or hydrocarbyloxy is defined hereinbefore and has no more than 12 carbon atoms, or X is halo, amino, hydrido and a is a number from 1 to 3 and (2) organotitanium compounds including the alkoxides of titanium such as tetra(isopropoxy) titanium, tetrabutoxy titanium and others wherein alkoxide has from 2 to 12 carbon atoms. Of the foregoing viscosity reducing agents, the preferred ones for use in preparation of Ziegler catalysts are the aluminum alkyls and ethers. Generally, however, preferred agents vary depending on the end use of the organomagnesium solution.

When employing the viscosity reducing agents that commonly are considered poisons for Ziegler catalysts, it is desirable to use such viscosity reducing agents in small quantities in order that the efficiency of the resultant catalyst will not be significantly decreased. Accordingly, such materials are employed in the minimum amounts that are effective to reduce the viscosity of the aforementioned hydrocarbon solution to the point that suspended solids of magnesium and similar solid impurities settle from the solution. Preferably, sufficient viscosity reducing agent is added to reduce the viscosity of the hydrocarbon solution to a value below 10 centistokes at 24° C. Of course, such viscosity reducing agents are advantageously employed in amounts less than those that measurably reduce the efficiency of the resultant Ziegler catalyst. While the actual amounts of the viscosity reducing agents required to generate the desired reduction of viscosity will vary with different diorganomagnesium compounds, different solubilizing agents and different viscosity reducing agents, it is generally found that from about 0.0001 to about 1.0 mole of viscosity reducing agent is employed per mole of diorganomagnesium compound, preferably from about 0.005 to about 0.2 mole per mole of magnesium compound. Like the solubilizing agent, the viscosity reducing agent may also be added before of during the formation of the organomagnesium compound, or it may be added after the organomagnesium compound has been combined with the solubilizing agent.

In this form the solubilized organomagnesium compound is ready for use as a reducing organometallic component in the preparation of a high yield Ziegler catalyst as disclosed in copending application Ser. No. 581,294 filed May 27, 1975, which is hereby incorporated by reference in its entirety.

The following examples are set forth for purposes of illustrating this invention and should not be construed as limiting its scope. Unless otherwise indicated, all parts and percentages are by weight.

EXAMPLE 1

A 6.075 gram portion of magnesium powder having an average particle size of 250 micrometers and dispersed in 400 mls. of Isopar E ® (a mixture of $C_8$ and $C_9$ paraffins) is reacted under a nitrogen atmosphere with stirring with 2.64 ml. of n-butyl chloride at reflux temperatures of 120°–126° C. A remaining amount of 23.76 mls. of n-butyl chloride is added over a period of 20 minutes. After the reaction is completed, 30 mls. of a 15.8 percent solution of diethyl zinc in hexane is added, and the solution is heated for 30 minutes. The reaction mixture is allowed to cool and forms a viscous liquid having a kinematic viscosity of 52.7 centistokes at 24° C. Analysis of a small sample of this viscous liquid indicates a concentration of 0.51 percent magnesium and 0.53 percent zinc. To the viscous mixture is added 6.0 mls. of a 0.5 molar solution of tetra(isopropoxy)titanium in Isopar E ®, and the resulting mixture is stirred at 24° C. The resulting solution immediately becomes less viscous with the solids settling easily when stirring is stopped. A supernatant sample containing 0.42% magnesium, 0.54% zinc, and 0.006% titanium is recovered.

EXAMPLE 2

A hydrocarbon solution of di-n-butyl magnesium and diethyl zinc is prepared as described in Example 1. To this viscous mixture is added 1.25 mls. of diethyl ether in a dropwise manner. Upon stirring at room temperature of 24° C., the resultant mixture immediately becomes less viscous with the solids settling easily when stirring is stopped. Analysis of the clear supernatant sample contains 0.6% magnesium and 0.5% zinc.

EXAMPLE 3

To a viscous hydrocarbon solution of di-n-butyl magnesium and diethyl zinc as prepared in Example 1 is added 0.5 mls. of triethylamine in a dropwise manner. Upon stirring at room temperature, the solution immediately becomes less viscous with solids settling when stirring is stopped. Analysis of the clear supernatant sample indicates 0.51% magnesium and 0.51% zinc.

EXAMPLE 4

To a viscous hydrocarbon mixture of di-n-butyl magnesium and diethyl zinc as prepared in Example 1 is added 2.0 mls. of anhydrous isopropanol in a dropwise manner. Upon stirring at room temperature, the viscosity of the solution decreases noticeably with the solid settling when stirring is stopped. Analysis of the clear supernatant sample indicates a concentration 0.84 percent magnesium and 0.73 percent zinc.

EXAMPLE 5

A hydrocarbon solution of di-n-butyl magnesium and diethyl zinc is prepared as described in Example 1. To this viscous mixture is added 0.5 mls. of 15% triethylaluminum solution in Isopar E ®. Upon stirring at room temperature of 24° C., the resultant mixture immediately becomes less viscous with the solids settling easily when stirring is stopped. Analysis of the clear supernatant sample contains 0.67% magnesium, 0.55% zinc, and 0.0036% aluminum.

EXAMPLE 6

A hydrocarbon solution of di-n-butyl magnesium and triethyl boron is made by the same method as Example 1 by substituting 27.8 mls. of a 10.2% solution of triethyl boron in Isopar E ® instead of diethyl zinc. This viscous solution has a kinematic viscosity of 40.1 centistokes and contains 0.54% magnesium. By the addition of 1.0 ml. of diethyl ether to this solution, the viscosity was lowered to 1.4 centistokes.

EXAMPLE 7

A 12.15 gram portion of magnesium powder having an average particle size of 250 micrometers and 200 mls. of Isopar E ® is reacted under a nitrogen atmosphere with stirring with 5.28 mls. of a 10% solution of n-butyl chloride at reflux temperatures of 120° to 125° C. A remaining amount of 47.52 mls. of the n-butyl chloride solution is added over a period of 30 minutes. After the reaction is completed, 60 mls. of a 15% solution of diethyl zinc in hexane is added, and the resultant mixture is heated to 100° C. with stirring for 30 minutes. When stirring is stopped, the resulting reaction mixture is allowed to cool and is observed to become quite viscous with a solid suspended in a thick liquid. To this viscous mixture, 2.0 mls. of 15% triethyl aluminum and Isopar E ® is added dropwise with stirring at room temperature of 24° C. When the stirring is stopped, the solution is noticeably less viscous with the solid settling easily to the bottom of the vessel. Analysis of the clear supernatant sample indicates 3.38% magnesium, 2.67% zinc and 0.015% aluminum.

EXAMPLE 8

Using a viscous hydrocarbon solution of di-n-butyl magnesium and diethyl zinc containing 0.84% magnesium and 0.11% zinc in hexane is tested for viscosity before and after addition of aluminum triethyl. The results are recorded in the following Table I.

TABLE I

| Sample No. | Al Concentration $\times 10^3$ | Mg:Al Atomic Ratio | Viscosity[1], cks. |
|---|---|---|---|
| 1* | 0 | 0 | 178.6 |
| 2 | 2.35 | 1400 | 60.1 |
| 3 | 4.7 | 700 | 31.3 |
| 4 | 7.05 | 467 | 18.8 |
| 5 | 9.4 | 350 | 11.6 |
| 6 | 11.75 | 280 | 8.6 |
| 7 | 14.1 | 233 | 6.8 |
| 8 | 16.45 | 200 | 5.0 |
| 9 | 40. | 82 | 4.1 |
| 10 | 63 | 52 | 1.7 |

*Not an example of the invention
[1]Kinematic viscosity measured in centistokes using an Ubbelohde viscometer.

EXAMPLE 9

A viscous hydrocarbon solution of di-n-butyl magnesium and triethyl boron containing 0.8% magnesium and a calculated 0.05% boron in hexane is tested for viscosity before and after addition of diethyl ether. The results are recorded in the following Table II.

TABLE II

| Sample No. | Ether Concentration, mMoles $\times 10^2$ | Atoms of Mg/mole of Ether | Viscosity[1], cks. |
|---|---|---|---|
| 1* | 0 | 0 | 155. |
| 2 | 2.5 | 125 | 8.1 |
| 3 | 5.0 | 62.8 | 3.7 |
| 4 | 7.5 | 41.8 | 2.8 |
| 5 | 10.0 | 31.4 | 2.3 |
| 6 | 12.5 | 25.1 | 2.0 |

*Not an example of the invention
[1]Kinematic viscosity measured in centistokes using an Ubbelohde viscometer at 24° C.

EXAMPLE 10

Several polymerization reactions are carried out in a five liter stainless steel stirred batch reactor at 150° C. In such polymerization reactions two liters of dry oxygen-free Isopar E ® are added to the reactor and heated to 150° C. The reactor is vented to about 25 psig and 15 to 20 psi of hydrogen is added for polymer molecular weight control. Then, 120 psi of ethylene is added to the reactor and the ethylene pressure is set to maintain the reactor pressure at 155 to 165 psig.

Catalysts are prepared by adding with stirring 1.5 mls. of 0.01 M tetra(isoproxy)titamium in Isopar E ® to 0.88 mls. of 15% ethyl aluminumdichloride followed by the addition of 3.0 mls. of an organomagnesium solution selected from Example Nos. 2–5 as shown in the following table. All catalysts are diluted to 100 mls. by addition of 94.62 mls. of Isopar E ®. Aliquots containing 10 mls. of these catalysts are added to the polymerization reactor and allowed to run for 30 minutes at 150° C.

TABLE III

| Run No. | Organomagnesium Solution, from Example No. Selected | Polyethylene Yield, grams polymer/gram Ti |
|---|---|---|
| 1 | 2 | $2.7 \times 10^6$ |
| 2 | 3 | $2.2 \times 10^6$ |
| 3 | 4 | $3.4 \times 10^6$ |
| 4 | 5 | $2.7 \times 10^6$ |

What is claimed is:

1. A solution of a diorganomagnesium component suitable as an organometallic component in the preparation of a Ziegler catalyst for the polymerization of α-olefins which solution comprising a diorganomagnesium compound, a liquid hydrocarbon solvent, a solubilizing compound selected from the group consisting of an organozinc, organoboron or mixtures thereof in an amount sufficient to solubilize the diorganomagnesium compound and an agent that reduces the viscosity of the solution without destroying the solution or any component thereof in an amount sufficient to facilitate separation of suspended solids from the solution.

2. The solution of claim 1 wherein the agent is selected from the group consisting of ethers, alcohols, tertiary amines, aldehydes, ketones, organoaluminum compounds, organotitanium compounds or mixtures thereof.

3. The solution of claim 1 wherein the agent is selected from the group consisting of aliphatic and cycloaliphatic ethers having 2 to 20 carbon atoms, aliphatic and aromatic alcohols having no more than 20 carbon atoms, tertiary alkyl amines having 3 to 20 carbon atoms, aldhydes and ketones having no more than 20 carbon atoms, organoaluminum compounds of the formula $AlR_aX_{3-a}$ wherein R is hydrocarbyl or hydrocarbyloxy having no more than 20 carbon atoms, X is halo, amino or hydrido and a is a number from 1 to 3, or an alkoxide of titanium wherein alkoxide has from 2 to 12 carbon atoms.

4. The solution of claim 1 wherein the diorganomagnesium compound is selected from the group consisting of dihydrocarbyl or dihydrocarbyloxy magnesium compounds or alkyl or aryl magnesium alkoxides or aryloxides, the solubilizing compound is selected from the group consisting of zinc or boron alkyls, aryls, aryloxides, or alkoxides, and the viscosity reducing agent is selected from the group consisting of aliphatic and cycloaliphatic ethers having 2 to 20 carbon atoms; organoaluminum compounds of the formula $AlR_aX_{3-a}$ wherein R is hydrocarbyl or hydrocarbyloxy having no more than 20 carbon atoms, X is halo, amino or hydrido and a is a number from 1–3; or an alkoxide of titanium.

5. The solution of claim 2 wherein the agent is present in an amount in the range from about 0.0001 to about 1 mole per mole of diorganomagnesium compound.

6. The solution of claim 4 wherein the diorganomagnesium compound is a dihydrocarbyl magnesium compound, the solubilizing compound is a zinc dialkyl or boron trialkyl, and the viscosity reducing agent is a trialkyl aluminum, a dialkyl or cycloalkyl ether or an alkoxide of titanium.

7. The solution of claim 4 wherein the dihydrocarbyl magnesium compound is a dialkyl magnesium compound and the solubilizing compound is a zinc dialkyl.

8. The solution of claim 6 wherein the diorganomagnesium compound is di(n-butyl)magnesium, the solubilizing compound is triethyl boron, and the viscosity reducing agent is diethyl ether.

9. A solution of a dialkyl magnesium suitable as an organometallic component in the preparation of a Ziegler catalyst for the polymerization of α-olefins which solution comprises (1) the dialkyl magnesium, (2) a liquid hydrocarbon solvent, (3) a hydrocarbyl, hydrocarbyloxide of zinc or boron or a mixture thereof in an amount sufficient to solubilize the dialkyl magnesium, and (4) an agent that reduces the viscosity of the solution without destroying the solution or any component thereof, said agent being present in an amount in the range from about 0.0001 to about 1 mole per mole of dialkyl magnesium and said agent being an ether, alcohol, tertiary amine, aldehyde, ketone, organoaluminum compound, organotitanium compound or mixture thereof.

10. The solution of claim 9 wherein the dialkylmagnesium compound is di(n-butyl)magnesium, the solubilizing compound is zinc diethyl, the viscosity reducing agent is an organoaluminum compound which is present in an amount in the range from about 0.005 to about 0.2 mole per mole of di(n-butyl)magnesium.

11. The solution of claim 9 wherein the agent is an alkoxide of titanium.

12. The solution of claim 10 wherein the viscosity reducing agent is aluminum triethyl.

13. The solution of claim 11 wherein the dialkyl magnesium compound is di(n-butyl)magnesium, the solubilizing compound is zinc diethyl, and the viscosity reducing agent is tetra(isopropoxy)titanium.

* * * * *